US007168393B2

(12) United States Patent
Bogdahn et al.

(10) Patent No.: US 7,168,393 B2
(45) Date of Patent: Jan. 30, 2007

(54) LEASH ASSEMBLY FOR A RETRACTABLE LEASH TO WALK ANIMALS

(75) Inventors: Manfred Bogdahn, Hamburg (DE); Steffen Wuensche, Hamburg (DE)

(73) Assignee: Flexi-Bogdahn Technik GmbH & Co. KG, Bargteheide (DE)

( * ) Notice: Subject to any disclaimer, the term of this patent is extended or adjusted under 35 U.S.C. 154(b) by 17 days.

(21) Appl. No.: 10/881,719

(22) Filed: Jun. 30, 2004

(65) Prior Publication Data

US 2005/0011472 A1  Jan. 20, 2005

(30) Foreign Application Priority Data

Jul. 1, 2003  (DE) .............................. 203 10 137

(51) Int. Cl.
*A01K 27/00* (2006.01)

(52) U.S. Cl. .................. 119/796; 242/397; 242/615.3

(58) Field of Classification Search ................ 119/794, 119/796; 242/397, 615.3; 33/761
See application file for complete search history.

(56) References Cited

U.S. PATENT DOCUMENTS

| 5,027,526 | A | * | 7/1991 | Crane | ........................... 33/763 |
| 5,483,926 | A | | 1/1996 | Bogdahn | .................... 119/796 |
| D392,429 | S | | 3/1998 | Plewa | ........................ D30/153 |
| 5,768,797 | A | * | 6/1998 | Trevino | ........................ 33/761 |
| 6,148,773 | A | | 11/2000 | Bogdahn | .................... 119/796 |
| D439,302 | S | | 3/2001 | Plewa | ........................ D30/153 |
| 6,405,451 | B1 | * | 6/2002 | Hsu | ............................ 33/767 |

FOREIGN PATENT DOCUMENTS

| EP | 0 536 859 A2 | | 4/1993 |
| JP | 55-106302 | * | 8/1980 |

OTHER PUBLICATIONS

One page English Abstract from esp@cenet for EP 0 536 859, Apr. 1993.

* cited by examiner

*Primary Examiner*—Robert P. Swiatek
(74) *Attorney, Agent, or Firm*—Howson & Howson LLP

(57) ABSTRACT

A leash assembly having a strap or leash that can be reeled or unreeled for walking animals. The assembly has a handle and a housing attached thereto in which the strap is arranged on a turnable roller device for being reeled or unreeled. The assembly also includes a brake key that can stop and prevent rotation of the roller device to restrict a part of the strap extending externally of the housing to a desired length. In addition, the assembly includes an exit opening through which the strap extends externally of the housing. Preferably, the exit opening is formed as a slit, and the slit has a central region along its longitudinal extension that has an enlarged opening portion extending laterally from at least one side of the slit.

24 Claims, 4 Drawing Sheets

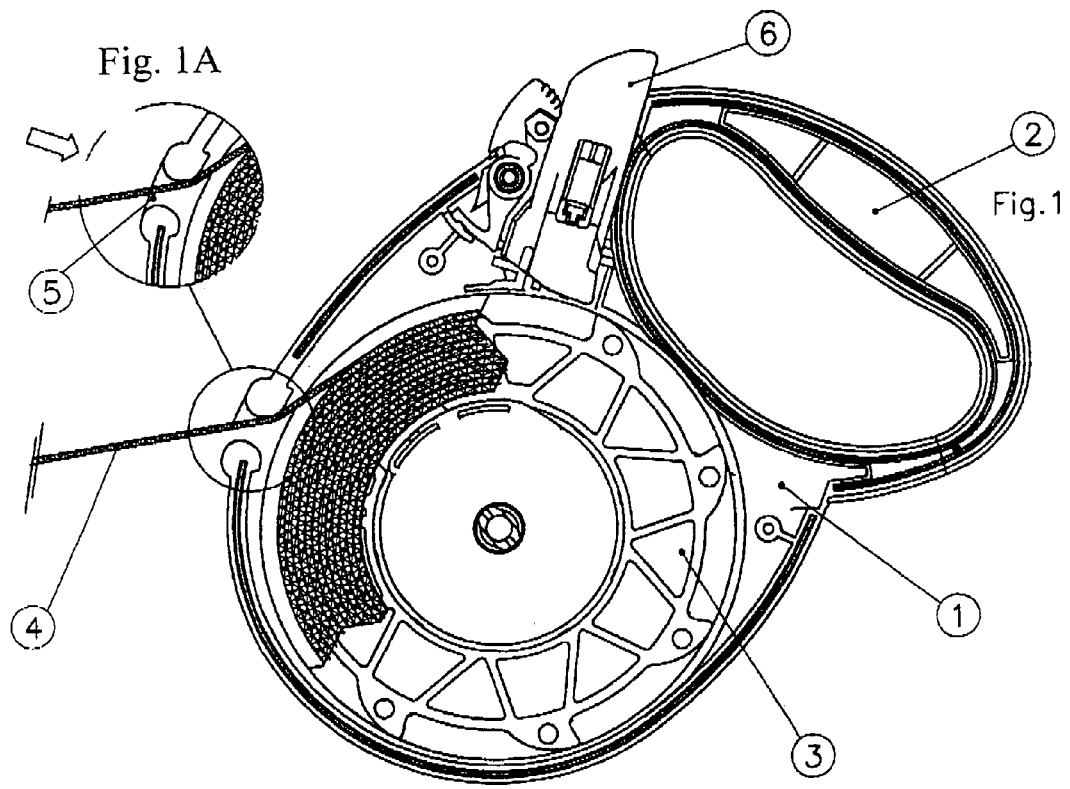
Fig. 1A
Fig. 1
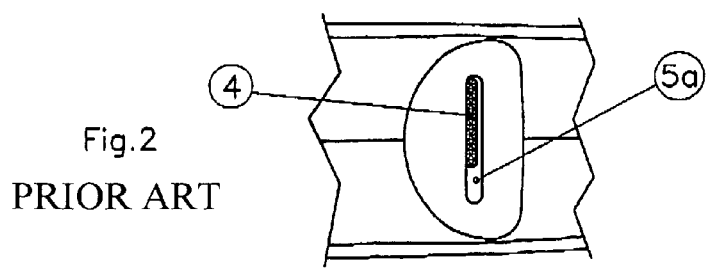
Fig. 2
PRIOR ART
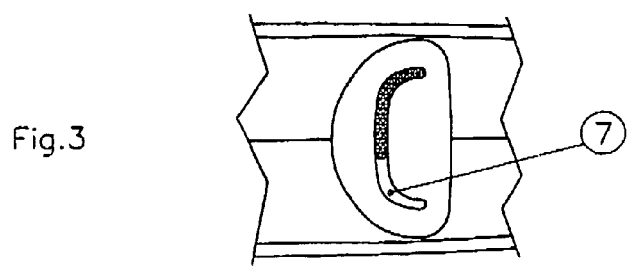
Fig. 3

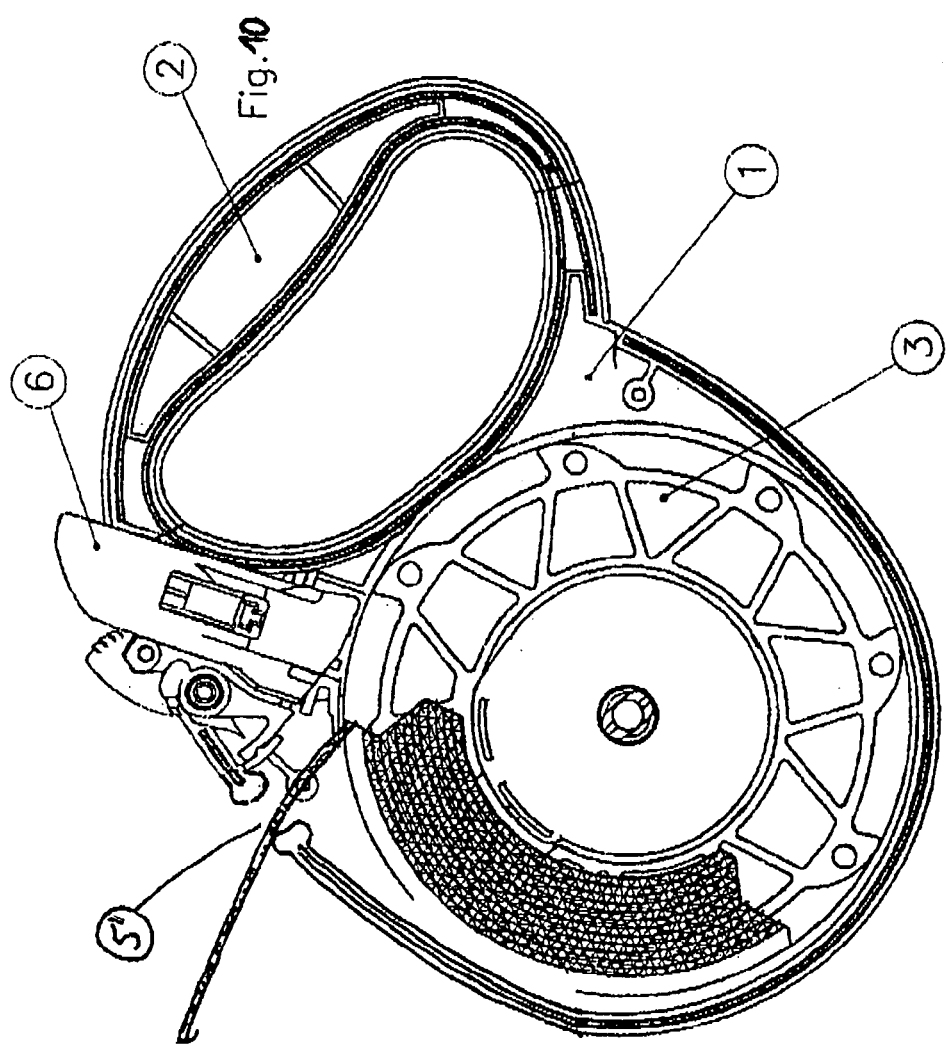

LEASH ASSEMBLY FOR A RETRACTABLE LEASH TO WALK ANIMALS

BACKGROUND OF THE INVENTION

The invention concerns a leash assembly for reeling and unreeling a strap or leash to walk animals. The leash assembly includes a handle and a housing attached therewith in which the strap is arranged on a turnable roller device for being reeled or unreeled. The assembly also includes a brake key which can stop the roller device and thus restrict the strap to a desired length. Furthermore, the housing has an exit opening through which the strap can extend outside the housing.

Such a leash assembly is known, for example, from U.S. Pat. No. 6,148,773. Such leash assemblies allow animals to be comfortably walked with a strap with an utmost degree of control. The strap unwinds from the roller device against the force of a spring and winds up automatically when released. Thus, the desired length of the strap can be freely chosen. The reeling or unwinding of the strap is stopped by the brake key. Leash assemblies of this kind comprise rope- or cord-like shaped leashes or ribbon-like shaped straps. The invention especially refers to ribbon-like shaped straps; however, use of the word "strap" herein does not imply any restriction at all to the type of strap.

There exists a risk that a strap folds upon itself and thus blocks the exit opening while being reeled or unreeled from or to the roller device. It is known from EP 0 526 859 A2 that this exit opening can be arch-shaped extending along a circular arc-section. But this arrangement cannot completely avoid the folding of the strap and the locking of the leash assembly.

It is an object of the invention to improve the above described leash assemblies such that the strap can easily be reeled or unreeled.

SUMMARY OF THE INVENTION

The object is solved according to the invention by forming the exit opening of the housing as a slit which has, in the middle region of its longitudinal extension, at least on one side an enlarged opening portion. It has been shown that by reason of the central enlargement formed by the widened opening portion of the exit opening a folded strap can be brought back in its original flat form. The unfolded and smooth strap is well led by the side areas of the slit adjacent to the enlarged opening portion. Thus, a perfect unreeling or reeling is guaranteed.

In principle, an enlargement on only one side is sufficient. But it is also possible to have an enlarged opening portion on both sides of the slit. Also, the exact centric arrangement of the enlargement or enlargements is not absolutely necessary. But, due to the symmetry and the fact that the strap is retracted sometimes from the one and sometimes from the other side and the folding can also take place in different directions, the substantially centric position of the enlarged opening portion is useful.

The enlarged opening portion of the exit opening is preferably semicircular. The enlarged opening portion can either point in the direction to or away from the handle. In both cases, a secure unfolding of the strap is effectuated during reeling or unreeling.

In general, the slit can be optionally shaped. It is possible to design the slit arch-shaped along a circular arc section. The slit can extend from more than 180° to 290° and preferably from more than 180° or 240° to 270° along the arc section. It is further possible that the slit extends along the shape of a horseshoe arch. In this case, the inner part thus formed is connected to the housing by a greater portion in comparison to a circular slit with the same arc angle. With that, the inner part is better secured against breakage. In all cases, it is preferable to have the enlarged opening portion at the inner side of this arch-shaped slit.

It is also possible that the slit is curved while having a nearly even or flattened section in the middle. The enlarged opening portion of the slit is preferably also situated at the inner side of the curve and in the even section of the slit, so that the unfolded strap is led perfectly through the central even section.

With such curved slits, the length of the slit is sometimes considerably longer than the width of the strap. In this case, it may be useful to provide the inner and/or outer edge of the slit with a plurality of enlarged opening sections, such as two or three enlarged opening sections. With that, an unfolding of the strap is ensured because it can easily run into an enlarged opening in any position relative to the leash assembly.

The edges of the enlarged opening portion of the exit opening are preferably rounded. Thus, an almost resistance-less unreeling or reeling is achieved when a folded strap comes into this enlargement. Furthermore, a roughening of the edges of the strap is avoided.

It is preferred that the slit is up to one-third or one-half longer than the width of the strap. With that, the strap is held loosely in the exit opening, so that it can easily run into the enlargement.

The slit can be integrally formed in the housing. It is also possible that the slit is formed by an insert mounted to the housing. Thus, the housing can also be used with other leash forms, e.g. with cord-like shaped leashes which require an almost circular exit opening.

It is favorable to place the slit in the handle or in the housing section which forms the handle. Thus, the tractive power of the pulling animal comes into effect near the person's hand. This avoids undesired overturning moments.

BRIEF DESCRIPTION OF THE DRAWINGS

In the following, the invention is further described by the schematic drawings:

FIG. 1 shows a sectional view of a leash assembly, including the guiding of the strap and the running strap, FIG. 1A shows a magnified view of an exit opening of the leash assembly, FIG. 2 shows a prior art exit opening for the strap formed as an even slit, FIG. 3 shows an exit opening for the strap with an arch-like slit, FIG. 10 is a cross-sectional view of an alternate embodiment of a leash assembly in which the exit opening is arranged at a region of the housing which forms the handle.

DESCRIPTION OF THE PREFERRED EMBODIMENT

Figure 3A:
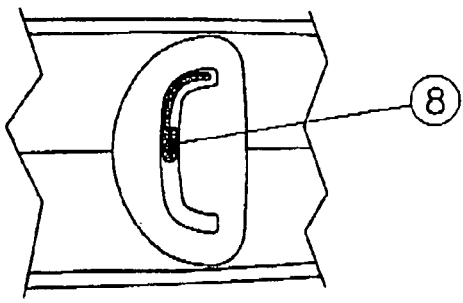
FIG. 3A shows the exit opening of FIG. 3 in which the strap has become folded upon itself.

The leash assembly for a leash which can be reeled and unreeled to walk animals, as shown in FIGS. 1 and 10, comprises a housing 1 with a handle 2 to carry the leash assembly. The housing contains a strap roller device 3 with a strap 4 which can be reeled thereon and which leaves the housing through an exit opening 5 (see FIG. 1) or 5' (see FIG. 10). Furthermore, a brake key 6 is provided in order to block the strap roller device and thus form a leash part in any desired length. At its free end, the leash is provided with a connecting hook. According to this, the leash assembly corresponds to a normal mechanically retractable leash assembly and needs no further explanation.

Figure 4:
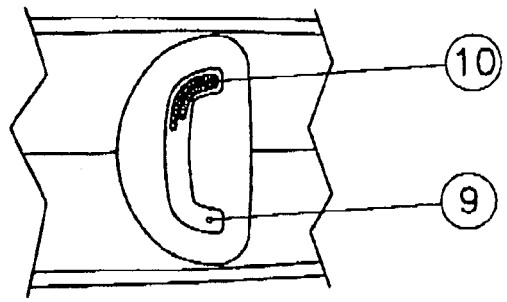
FIG. 4 shows a wide exit opening for the strap with a folded strap.

Normally, such leash assemblies equipped with straps have a narrow rectangular slit 5a which can be integrated into the housing as shown in FIG. 2 and through which the strap is guided to the outside. As shown in FIG. 3, it is also possible to design the slit 7 arch-shaped in order to avoid a cutting in of the strap into the ends of the slit. As shown in FIG. 3a, in a small slit which has the same size all over, a twisted or folded strap 8 blocks this slit when running in or out. The automatic leash function is no longer ensured. A relative broad slit 9 according to FIG. 4, in which a multiple folded strap 10 does not get stuck, does not stabilize the strap. The folded strap can lie permanently in a double layer. Thus, the winding amount on the roller device increases considerably so that the roller device is overloaded and cannot function correctly.

Figure 5:
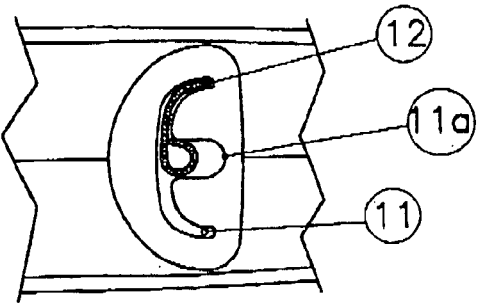
FIG. 5 shows an arch-shaped exit opening for the strap with a semicircular enlargement according to the present invention.
Figure 6:
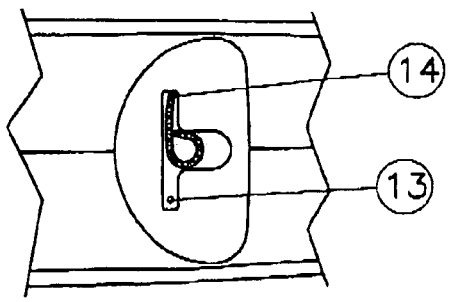
FIG. 6 shows an even exit opening for the strap with a semicircular enlargement according to the present invention.
Figure 7:
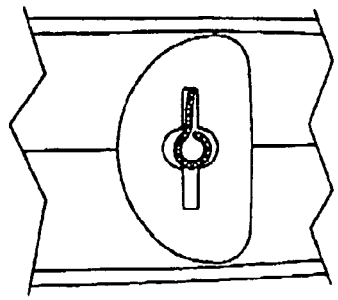
FIG. 7 shows an exit opening for the strap with a semicircular enlargement on both sides according to the present invention.

In the additionally shown embodiments in FIGS. 5 to 7, a folded strap can go through and, due to the geometry of the slit, the strap is led back to its flat and regular basic form. In the embodiment as shown in FIG. 5, the strap is led in an arch-shaped slit 11 which has a flattened middle part. The slit is only slightly broader than the thickness of the strap but it is from one third up to one half longer than the width of the strap. In the middle, the slit for the strap has a semicircular rounded enlargement portion 11a allowing the folded strap 12 to easily run in and out, but, at the same time, forming the strap to its original flat form due to the profile of the slit. Thus, the strap is stabilized in its basic form in the lateral guiding, whereas folds and doublings can run in and out in the center part of the slit. But in this case, the strap is folded back into the flat form.

This central enlargement is also possible concerning a straight slit 13 as shown in FIG. 6, which can very easily be produced. Further, such a central enlargement is possible on both sides of the slit, as shown in FIG. 7.

The enlarged opening portion is designed semicircular at its end region. It is possible that the semicircle is situated directly next to the slit, as for example shown in FIG. 7 with the enlargement on both sides. Furthermore, it is possible, as shown in FIGS. 5 and 6, that between the semicircular end region and the slit a straight region is arranged the width of which corresponds to the diameter of the semicircle. Thus, a relative deep enlarged opening portion is formed.

Figure 8:
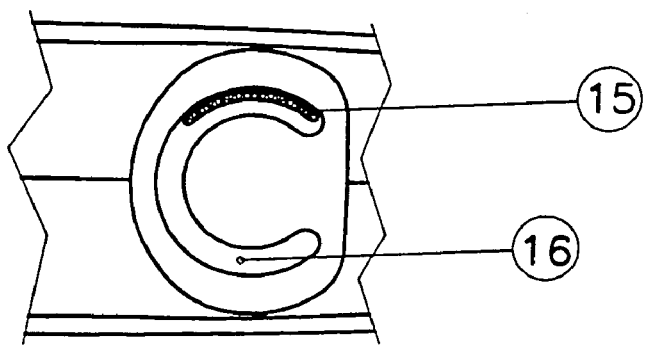
FIG. 8 shows an exit opening for the strap according to another embodiment of the invention.
Figure 9:
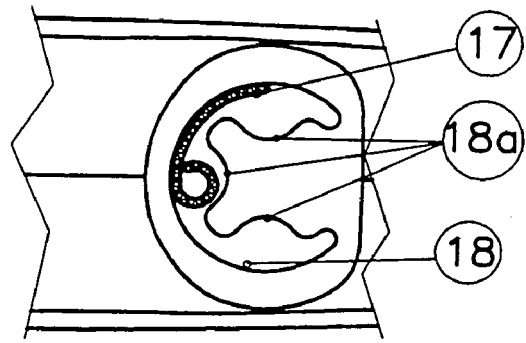
FIG. 9 shows an exit opening for the strap which opening comprises a plurality of enlarged opening sections according to the present invention.

FIG. 8 shows another embodiment of the opening for the strap for a secure guiding of the strap 15. The slit 16 extends over an arc section of about 270° along the form of a horseshoe arch. By means of the high sides of the slit the strap does not reach the end regions of the slit and can run almost resistanceless. Damage to the edges of the strap as well as the end regions of the slit is thereby avoided. FIG. 9 shows a similar slit 18 which is provided with three enlarged opening portions 18a at the inner edge of the slit. For unfolding, a folded strap 17 can run into an enlarged opening section in any position relative to the housing. In this embodiment, the enlarged opening sections are not very deep and are formed as hollows.

The width of the enlarged opening portion of the exit opening corresponds at least to the double, preferably at least to the triple to quadruple, thickness of the strap. The depth of said enlarged opening portion corresponds at least to the double, preferably at least to the triple to quadruple, width of the slit. The distance between one edge of the central enlargement and the corresponding lateral boundary of the slit is about the half of the width of the strap and may be slightly smaller or broader than the half of the width of the strap.

The invention claimed is:

1. A leash assembly for a strap or leash which can be reeled and unreeled to walk animals, comprising:
    a handle and a housing attached thereto in which the strap is arranged on a turnable roller device for reeling and unreeling,
    a brake key which can stop said roller device and restrict the strap extending from said housing to a desired length, and
    an exit opening through which the strap extends outside of said housing,
    said exit opening of said housing being formed as a slit which has, in a central region of its longitudinal extension, an enlarged opening portion that extends from at least one side of said slit, said enlarged opening portion of said exit opening having a semicircular end region opposite said slit.

2. A leash assembly according to claim 1, wherein said enlarged opening portion of said exit opening extends from both sides of said slit.

3. A leash assembly according to claim 1, wherein said enlarged opening portion points in a direction toward said handle.

4. A leash assembly according to claim 1, wherein said enlarged opening portion extends in a direction opposite to said handle.

5. A leash assembly according to claim 1, wherein said slit is arch-shaped.

6. A leash assembly according to claim 5, wherein said arch-shaped slit extends from about 180° to about 290° along an arc.

7. A leash assembly according to claim 5, wherein said arc-shaped slit extends from greater than 180° to about 270° along an arc.

8. A leash assembly according to claim 5, wherein said arch-shaped slit extends from about 240° to about 270° along an arc.

9. A leash assembly according to claim 5, wherein said slit extends along a circular arc.

10. A leash assembly according to claim 5, wherein said slit is horseshoe-shaped.

11. A leash assembly according to claim 5, wherein said enlarged opening portion is situated at an inner side of said arch-shaped slit.

12. A leash assembly according to claim 1, wherein said slit is curved and has a central region that is substantially straight.

13. A leash assembly according to claim 1, wherein said enlarged opening portion has rounded edges.

14. A leash assembly according to claim 1, wherein said strap has a predetermined width, and wherein said slit has a length that is at least one third (⅓) longer than said predetermined width of said strap.

15. A leash assembly according to claim 14, wherein said slit has a length that is at least one half (½) longer than said predetermined width of said strap.

16. A leash assembly according to claim 1, wherein said slit is integrally formed in said housing.

17. A leash assembly according to claim 1, wherein said slit is formed by an insert mounted to said housing.

18. A leash assembly according to claim 1, wherein said slit is arranged at the handle or at a region of the housing which forms the handle.

19. A leash assembly according to claim 1, wherein said strap has a flat form when positioned on said roller device within said housing, wherein said strap is foldable and twistable upon itself when unreeled from said housing, and wherein said enlarged opening portion of said exit opening is located and sized to receive a folded portion of said strap during reeling of said strap to return said folded portion to said flat form before being wound on said roller device.

20. A leash assembly for a strap or leash which can be reeled and unreeled to walk animals, comprising:

a handle and a housing attached thereto in which the strap is arranged on a turnable roller device for reeling and unreeling, a brake key which can stop said roller device and restrict the strap extending from said housing to a desired length, and an exit opening through which the strap extends outside of said housing, said exit opening of said housing being formed as an arched-shaped slit which extends from greater than 180° to about 290° along an arc.

21. A leash assembly according to claim 20, wherein said arched-shaped slit extends from greater than 180° to about 270° along an arc.

22. A leash assembly according to claim 20, wherein said arched-shaped slit extends from about 240° to about 270° along an arc.

23. A leash assembly according to claim 20, wherein said slit extends along a circular arc.

24. A leash assembly according to claim 20, wherein said slit is horseshoe-shaped.

* * * * *